Patented Nov. 18, 1952

2,618,639

UNITED STATES PATENT OFFICE 2,618,639

PROCESS FOR ISOLATING ISOQUINOLINE FROM MIXTURES THEREOF WITH HETEROCYCLIC NITROGEN BASE

Henry L. Stasse, Hawthorne, N. J., assignor to Allied Chemical & Dye Corporation, New York, N. Y., a corporation of New York No Drawing. Application September 6, 1951, Serial No. 245,430

12 Claims. (Cl. 260—286)

This invention relates to a process for isolating isoquinoline from mixtures of heterocyclic nitrogen bases having boiling points closely related to that of isoquinoline so that separation by fractional distillation is difficult and costly. The invention more particularly relates to a process for isolating isoquinoline from such mixtures in a high degree of purity, and particularly from crude isoquinoline fractions containing substantial proportions of isoquinoline together with quantities of other nitrogen bases, such as quinaldine (α-methyl quinoline) and quinoline.

Pyridine, quinoline, isoquinoline and their homologs are customarily extracted along with other nitrogen bases from coke-oven distillates and other sources of heterocyclic nitrogen bases by means of an aqueous solution of a mineral acid, usually sulfuric acid, whereby a mixture of bases boiling over a wide temperature range is obtained. After liberation from the acid solutions by means of alkali, the base mixtures thus obtained are usually fractionally distilled to obtain fractions enriched with respect to a particular base. Isoquinoline-containing fractions may thus be obtained, such fractions usually boiling predominantly within the range between about 239° C. and about 250° C. These fractions may vary in isoquinoline content from about a few percent to about 90%, the remainder consisting of other nitrogen bases of boiling range close to isoquinoline and not readily separable therefrom by distillation, e. g., quinoline, quinaldine, alkyl pyridines such as tetramethyl pyridines and sometimes traces of primary aromatic amines such as cumidines. Mixtures of this kind have found limited practical application and are of relatively low economic value. Pure isoquinoline, however, is a product of considerable commercial interest, being useful, for example, in the preparation of pharmaceutical products and dyes. The purity requirements in these fields are high and rigid.

In the past, efforts have been made to obtain pure isoquinoline from crude fractions of the character described above, by treating the fraction with limited quantities of concentrated sulfuric acid to precipitate isoquinoline as its sulfuric acid salt, and repeating the treatment successively upon the enriched product recovered in each previous step from the isoquinoline-sulfuric acid salt. In this manner it was possible by successive precipitations to prepare an isoquinoline-containing material of about 93% purity as isoquinoline. However, the purity obtainable by such method reaches a maximum at about 93% purity, and after such purity has been achieved, successive precipitations with concentrated sulfuric acid fail further to enrich the product with respect to isoquinoline. Thus, this process fails to provide an isoquinoline product having a purity high enough for many commercial purposes, a purity of at least about 95% often being required.

Another prior art effort to produce pure isoquinoline has taken the form of selective precipitation of isoquinoline from crude isoquinoline fractions in the form of its calcium chloride addition compound. This process, while an improvement on the sulfuric acid precipitation in producing a relatively high purity isoquinoline, achieved such purities only at a considerable sacrifice in yields of isoquinoline.

I have now found that isoquinoline fractions can be enriched and that isoquinoline can be prepared in high degrees of purity accompanied by high yields according to my invention wherein isoquinoline sulfate is selectively separated from a mixture in substantially anhydrous acetic acid of a mixture of sulfates of heterocyclic nitrogen bases containing substantial quantities of isoquinoline together with other close boiling nitrogen base compounds such as quinoline and quinaldine.

Crude heterocyclic nitrogen base mixtures boiling within the range between about 240° C. and about 244° C. contain a number of nitrogen bases with isoquinoline usually predominating and usually present in amounts between about 50% and about 90%. Other important components of such mixtures usually include appreciable quantities of quinoline and usually somewhat lesser quantities of quinaldine (α-methyl quinoline) and minor quantities of other nitrogen bases.

Other sources of isoquinoline are nitrogen base residues remaining from the selective recovery of other nitrogen bases especially quinoline, or the like, from fractions in which the selectively recovered nitrogen base originally predominated, but which when freed of the predominating base by selective recovery steps leave residues containing substantial quantities of isoquinoline along with lesser quantities of other bases such as quinoline and quinaldine, and mixed sulfates of such nitrogen bases from any source containing appreciable quantities of isoquinoline sulfate.

The process of my invention is adapted to produce enriched or highly pure isoquinoline products not only from the so-called "isoquinoline cuts" or fractions above described, which usually contain at least about 50% isoquinoline, but also from isoquinoline-containing residues or other mixtures boiling within the wider boiling range previously mentioned containing at least about 33% isoquinoline, and not more than about 23% quinaldine, or from mixed nitrogen base sulfates in which the bases are present in the above ratios. In addition, my process is adapted to improve the purity of isoquinoline materials hitherto considered of high purity, for example of 95% or above, up to a purity of about 99.8% or above. In short my process is adapted to produce enriched or "pure" isoquinoline (95–99.8% purity) from mixtures of isoquinoline-containing nitrogen bases or their sulfates herein referred to as "isoquinoline materials," containing at least about 33% isoquinoline and not more than about 23% quinaldine, by the use of one or more cycles, depending on the original isoquinoline concentration and upon the purity desired, as more fully described hereinafter.

In carrying out the process according to my invention I prepare a mixture of acetic acid and mixed nitrogen base sulfates of the character described using a quantity of substantially anhydrous acetic acid sufficient to dissolve at least all of the nitrogen base sulfates other than isoquinoline sulfate at the temperature of eventual separation. The mixture may be a true solution of all the mixed sulfates, or it may be a slurry containing a solution of all the nitrogen base sulfates other than isoquinoline, or it may take the form of an acetic acid wash of the mixed sulfates, etc.

Such mixtures may be prepared in any suitable manner, for example, by utilizing a source of mixed sulfates already available; or by first preparing and isolating the mixed nitrogen base sulfates from a mixture of nitrogen bases and then dissolving the sulfates wholly or partly in the acetic acid; or the mixed nitrogen bases in the free base state may be dissolved in acetic acid and subsequently converted to their sulfates by any suitable means, for example by adding a quantity of sulfuric acid sufficient to convert all the bases substantially completely to the sulfates.

The separation of isoquinoline sulfate from the remaining base sulfates may be effected by selective crystallization of the isoquinoline sulfate from, or by extraction of the nitrogen base sulfates other than isoquinoline sulfate with, acetic acid or by a combination of the two procedures.

If selective crystallization is employed, the acetic acid solution of the sulfates is brought to a temperature sufficiently high to maintain all the nitrogen base sulfates in solution. The solution is then gradually cooled to effect selective crystallization of the isoquinoline sulfate leaving the sulfates of the remaining bases in solution in the acetic acid. The crystalline isoquinoline sulfate may be separated from the mother liquor in any suitable manner as by filtration, decantation or the like, and washed, if desired, with acetic acid, dried, and the purified, isoquinoline-enriched free bases liberated with an alkaline material such as sodium hydroxide in conventional manner.

If extraction is employed, the mixed sulfates may for example be slurried with acetic acid followed by mechanical separation of the purified isoquinoline sulfate or the mixture of sulfates may be washed on a filter or otherwise treated to dissolve and extract the nitrogen base sulfates other than isoquinoline sulfate.

Conveniently, a combination of both methods may be used, especially when separating mixed nitrogen bases, by first selectively crystallizing the preponderant portion of the isoquinoline as its sulfate, and then washing the precipitate one or more times with acetic acid or by washing and recrystallizing the isoquinoline sulfate from acetic acid.

According to my invention, isoquinoline or isoquinoline sulfate crudes containing at least about 70% isoquinoline or above and not more than about 10% quinaldine may usually be enriched in a single crystallization step to produce yields of upwards of 85% of commercially "pure" isoquinoline, i. e. of 95% or above.

If higher purities are desired or if isoquinoline crudes of lesser isoquinoline content or higher quinaldine content (up to about 23% quinaldine) are used, one or more additional crystallization or extraction cycles or both may be required to reach the desired purity. For example, isoquinoline materials of purities even high enough to be considered commercially pure, may be improved by additional cycles up to a purity of about 99.8% as pointed out above. In any case, the process of my invention in any cycle effects, by selective crystallization or extraction, the separation of at least a preponderant proportion of the isoquinoline sulfate as a solid product, leaving a preponderant proportion of the sulfates of the bases other than isoquinoline in solution in the acetic acid.

In the process of the invention, advantage is taken of the differences in solubility of the several nitrogen base sulfates in anhydrous acetic acid, which are approximately as listed in Table I below:

TABLE I

*Solubilities of several nitrogen base sulfates in glacial acetic acid at various temperatures*

| Nitrogen Base Sulfate | Percent Solubility in Acetic Acid at Temperature | | |
| --- | --- | --- | --- |
|  | 23° C. | 30° C. | 50° C. |
| Quinoline Sulfate | >25 | >25 | >30 |
| Isoquinoline Sulfate | 0.79 | 1–2 | 4–6 |
| Quinaldine Sulfate | 1.45 | 2–3 | 8–10 |

The solubility of isoquinoline sulfate, therefore, is consistently less than the other two nitrogen bases shown, within a range of convenient operating temperatures. That is, it is sufficiently high at mildly elevated temperatures, e. g. 50° C. or above, so that substantial quantities can be cleanly dissolved in an amount of acetic acid which is not unduly excessive; and, by relatively slight reductions in temperature can be readily crystallized substantially completely.

As will be observed from Table I, the solubility of quinoline sulfate in glacial acetic acid is relatively much higher than that of isoquinoline sulfate at all temperatures shown, the difference in solubilities between quinoline sulfate and isoquinoline sulfate being so great that separation by selective crystallization of these two bases is readily effected. However, it will be observed that the solubility differential between isoquinoline sulfate and quinaldine sulfate is considerably less, so that it might be expected that substantial amounts of quinaldine, if present in the crude, would be co-precipitated as the sulfate with the isoquinoline sulfate. I have discovered, however, that the presence of quinoline sulfate in the mixture markedly increases the solubility of the quinaldine sulfate in glacial acetic acid, for example, the solubility of quinaldine sulfate in acetic acid containing 15% quinoline sulfate was found to be 1 to 2% higher than in acetic acid alone, for instance at 23° the solubility rises to around 3%. Accordingly, crudes containing up to about 23% quinaldine can be made to yield isoquinoline of at least about 90% isoquinoline by a single cycle and about 97% purity by the use of two purification cycles. If quinaldine is entirely or substantially absent from the crude, and essentially only quinoline is present with the isoquinoline, substantially complete isolation of the isoquinoline can usually be effected in a single cycle to produce isoquinoline of a purity of about 98% even from crudes containing quanties of isoquinoline as low as about 50%.

On the other hand, crudes containing high percentages of quinaldine and low percentages of isoquinoline, for example about 50% quinaldine and about 25% isoquinoline, can be enriched in isoquinoline by a single cycle of my process, e. g. from about 25% to about 34% isoquinoline.

For this reason, I prefer to utilize crudes containing at least about 33% isoquinoline, and not more than about 23% quinaldine. Crudes outside this range can be more profitably treated by other methods as by distillation to bring them within the preferred concentration limits. Isoquinoline crudes boiling between about 240° C. and about 244° C. and containing from about 50% to about 90% isoquinoline and not more than about 23% quinaldine, and obtained by fractional distillation of coal tar nitrogen bases are especially suitable.

The quantity of acetic acid used should be at least sufficient to substantially completely dissolve all the nitrogen base sulfates other than isoquinoline sulfate, at the temperature of ultimate separation and an excess of acetic acid may be used if desired. Preferably a quantity is used sufficient to produce a readily workable mixture for eventual separation of solid isoquinoline sulfate from solutions of the contaminating sulfates in the acetic acid and to prevent undue occlusion of contaminating base sulfates with the recovered isoquinoline sulfate crystals. In selective crystallizations, such quantity will often be sufficient to completely dissolve all the nitrogen base sulfates, including isoquinoline sulfate, and quantities considerably in excess of this last mentioned amount may be used if desired. In general, a quantity of acetic acid equal to at least about twice the weight of all the free nitrogen bases present is used, preferably between about 2 and about 5 times the weight of the all nitrogen bases.

The amount of 100% sulfuric acid added should be sufficient to combine with all the nitrogen bases in the mixture, to form the nitrogen base sulfates, namely about one mol of sulfuric acid per mol of nitrogen bases in order that advantage may be taken of their differences in solubility in the acetic acid medium to effect clean separation of the bases as their sulfates. The sulfuric acid addition is carried out slowly with stirring, preferably at a rate sufficient to cause the temperature to rise to, and be maintained at, a temperature sufficiently high to prevent crystallization of isoquinoline sulfate during the sulfuric acid addition, usually between about 60° C. and about 100° C.

The degree of cooling of the solution to bring about crystallization of the isoquinoline sulfate will vary with the isoquinoline sulfate concentration, and should be sufficient to bring the temperature to a point well below the saturation concentration of isoquinoline sulfate. Usually cooling to 10°–20° below the solution temperature is sufficient to initiate crystallization and cooling to about 25°–30° C. is usually sufficient to effect crystallization of a substantial yield of greatly purified isoquinoline sulfate.

In carrying out a series of isoquinoline purifications as in commercial operations, the mother liquors and wash liquors may advantageously be recycled to the subsequent process steps. For example, in cases where two or more crystallizations of the isoquinoline sulfate from acetic acid are carried out, the mother liquors from the second or later crystallization steps, containing primarily acetic acid and very low concentrations of contaminating nitrogen bases, may advantageously be used to dissolve fresh nitrogen bases in a subsequent batch. Wash liquors of acetic acid which have been used in washing isoquinoline sulfate crystals may be similarly reused.

The following specific examples further illustrate my invention. Parts are by weight except as otherwise indicated.

EXAMPLE 1

To 195 parts of a nitrogen base mixture containing about 73% isoquinoline, about 22% quinoline and about 5% quinaldine, were added 500 parts of glacial acetic acid. To this mixture were added slowly with stirring 152 parts of 100% sulfuric acid, an amount molecularly equivalent to all the nitrogen bases in the mixture. The temperature of the solution was allowed to rise to, and was maintained at, about 80° C. during the sulfuric acid addition. The reaction mass was then cooled to promote crystallization of the isoquinoline sulfate, crystallization starting at about 68° C. The cooling was continued to 30° C., whereupon the mass was filtered on a Buchner funnel and the crystals washed five times with 150 parts of acetic acid. The isoquinoline sulfate cake, amounting to 320 parts, was dissolved in about 100 parts of water, the isoquinoline was liberated with sodium hydroxide solution, and, after separation of the layers and washing three times with water, was distilled. The recovered isoquinoline amounted to 143 parts having a limpid point of 21.3° C. corresponding to an isoquinoline content of 90% and equivalent to a yield of 92% of the isoquinoline content of the nitrogen base mixture.

EXAMPLE 2

195 parts of a nitrogen base fraction obtained by fractional distillation of mixed nitrogen bases obtained from coal tar, boiling between about 240° C. and about 244° C. and having a limpid point of 15.5° C. and containing about 75% isoquinoline, the remainder being primarily quinoline, together with about 2% of quinaldine, was dissolved in 500 parts of glacial acetic acid and treated with 149 parts of 100% sulfuric acid as described in Example 1. The isoquinoline recovered amounted to 128 parts corresponding to 86% of the isoquinoline in the charge. It had a limpid point of 24.4° C. corresponding to a purity of 96.5%.

EXAMPLE 3

To 195 parts of a nitrogen base mixture containing about 71% isoquinoline, about 27% quinoline and about 2% quinaldine, were added 500 parts of glacial acetic acid. To this mixture were added slowly with stirring 150 parts of 100% sulfuric acid, an amount molecularly equivalent to all the nitrogen bases in the charge. The temperature was allowed to rise to, and was maintained at, about 80° C. during the sulfuric acid addition to keep the sulfates in solution. The solution was cooled to 30° C. to promote crystallization of isoquinoline sulfate, crystallization starting at 70° C. The precipitated isoquinoline sulfate was filtered on a Buchner funnel and washed three times with acetic acid. The wet crystals were then redissolved in 315 parts of glacial acetic acid at 98° C. and the solution then allowed to cool with stirring to effect recrystallization which began at about 95° C. The mass was further cooled to 30° C., filtered at this temperature, and washed three times with acetic acid. The purified isoquinoline sulfate filter cake amounted to 278 parts. It was dissolved in 100 parts of water and the base liberated by the addition of an excess of sodium hydroxide solution. The base was washed three times with water and was distilled. The yield of essentially pure isoquinoline having a limpid point of 26.0° C. corresponding to 99.5% purity amounted to 112 parts or 80% of the isoquinoline content of the nitrogen bases charged.

EXAMPLE 4

196 parts of a residue obtained from a quinoline fraction after removal of the major portion of the quinoline and containing about 33% isoquinoline, about 10.5% quinoline and about 23% quinaldine, were mixed with 500 parts of glacial acetic acid. To this mixture were added slowly with stirring 149 parts of 100% sulfuric acid at a rate such that the temperature rose to a maximum of about 83° C. during the addition of sulfuric acid and was maintained at such temperatures that all the nitrogen base sulfates formed remained in solution. The mixture was then cooled to 25° C. and filtered at this temperature to remove the isoquinoline sulfate precipitate which had formed. The filter cake was washed with acetic acid, recrystallized from 630 parts of acetic acid and the recrystallized product washed with acetic acid. The nitrogen bases were recovered from their sulfates by liberation with alkali as described in previous examples. The yield amounted to 136 parts of isoquinoline corresponding to 70% of the isoquinoline in the nitrogen bases charged. The isoquinoline product had a limpid point of 25.0° C. corresponding to 97% purity.

EXAMPLE 5

160 parts of a nitrogen base mixture having a limpid point of 25.3° C. and containing about 98% isoquinoline, about 1½% quinoline and about ½% quinaldine, were mixed with 450 parts of glacial acetic acid. To this mixture were added slowly with stirring 120 parts of 100% sulfuric acid. The precipitation of the isoquinoline sulfate and recovery of the isoquinoline was carried out as described under Example 3 and resulted in a yield of 130 parts of isoquinoline corresponding to 84% of the isoquinoline in the charge and having a limpid point of 26.5° C. corresponding to a purity of 99.85% isoquinoline.

While the above describes the preferred embodiments of my invention, it will be understood that departures may be made therefrom within the scope of the specification and claims.

I claim:
1. In a process for preparing an enriched isoquinoline material from products of lesser purity, the steps which comprise, effecting solution in substantially anhydrous acetic acid of a mixture of sulfates of heterocyclic nitrogen bases containing at least about 33% isoquinoline and not more than about 23% quinaldine, the remainder being essentially quinoline, at a temperature at least sufficiently high to maintain at least all the nitrogen base sulfates other than isoquinoline sulfate in solution, and thereafter cooling the mixture to a temperature sufficiently low to bring about the precipitation of a preponderant proportion of the isoquinoline sulfate and to leave a preponderant proportion of the sulfates of the nitrogen bases other than isoquinoline in solution in the acetic acid.

2. In a process for preparing a substantially pure isoquinoline material from products of lesser purity, the steps which comprise, effecting solution in substantially anhydrous acetic acid of a mixture of sulfates of heterocyclic nitrogen bases containing at least about 33% isoquinoline and not more than about 23% quinaldine, the remainder being essentially quinoline, at a temperature at least sufficiently high to maintain all the nitrogen base sulfates other than isoquinoline sulfate in solution, and thereafter cooling the mixture to a temperature sufficiently low to bring about precipitation of a preponderant proportion of the isoquinoline sulfate and to leave a preponderant proportion of the sulfates of the nitrogen bases other than isoquinoline in solution in the acetic acid, recovering said isoquinoline sulfate product and thereafter effecting at least one recrystallization from glacial acetic acid.

3. In a process for preparing an enriched isoquinoline material from products of lesser purity, the steps which comprise, effecting solution in substantially anhydrous acetic acid of a mixture of sulfates of heterocyclic nitrogen bases containing at least about 33% isoquinoline and not more than about 23% quinaldine, the remainder being essentially quinoline, at a temperature at least sufficiently high to maintain all the nitrogen base sulfates in solution, and thereafter cooling the mixture to a temperature sufficiently low to bring about precipitation of a preponderant proportion of the isoquinoline sulfate and to leave a preponderant proportion of the sulfates of the nitrogen bases other than isoquinoline in solution in the acetic acid.

4. In a process for preparing an enriched isoquinoline material from a mixture of sulfates of heterocyclic nitrogen bases containing at least about 33% isoquinoline sulfate and not more than about 23% quinaldine sulfate, the remainder being essentially quinoline sulfate, the steps which comprise mixing with said mixture of nitrogen base sulfates substantially anhydrous acetic acid in a quantity and at a temperature such as to substantially completely dissolve at least all of said nitrogen base sulfates other than isoquinoline sulfate, and thereafter recovering solid isoquinoline sulfate.

5. In a process for preparing an enriched isoquinoline material from heterocyclic nitrogen base mixtures containing at least about 33% isoquinoline and not more than about 23% quinaldine, the remainder being essentially quinoline, the step which comprises dissolving said nitrogen base mixture in at least about twice its weight of glacial acetic acid, adding thereto a quantity of 100% sulfuric acid molecularly equivalent to the total nitrogen bases present while maintaining the temperature of the mixture at at least about 60° C., thereafter cooling the solution below about 30° C. and recovering the isoquinoline sulfate product thus precipitated.

6. In a process for preparing a substantially pure isoquinoline material from heterocyclic nitrogen base mixtures containing at least about 33% isoquinoline and not more than about 23% quinaldine, the remainder being essentially quinoline, the step which comprises dissolving said nitrogen base mixture in at least about twice its weight of glacial acetic acid, adding thereto a quantity of 100% sulfuric acid molecularly equivalent to the total nitrogen bases present while maintaining the temperature of the mixture at at least about 60° C., thereafter cooling the solution below about 30° C., recovering the isoquinoline sulfate from glacial acetic acid.

7. In a process for preparing substantially pure isoquinoline material from mixtures of heterocyclic nitrogen bases boiling within the range between about 240° C. and about 244° C. containing at least about 70% isoquinoline and not more than about 10% quinaldine, the steps which comprise dissolving said nitrogen base mixture in at least about twice its weight of glacial acetic acid, adding thereto a quantity of 100% sulfuric acid molecularly equivalent to the total of nitrogen bases present, while maintaining the temperature equal to at least about 80° C., thereafter cooling the solution to between about 68° C. and about 30° C. and recovering the isoquinoline sulfate thus precipitated.

8. In a process for preparing an enriched isoquinoline material from mixtures of heterocyclic nitrogen bases containing isoquinoline along with other close boiling nitrogen bases, the steps which comprise dissolving said nitrogen base mixture in glacial acetic acid, adding thereto sufficient 100% sulfuric acid to combine with all the nitrogen bases to form the sulfates thereof while maintaining the temperature of the solution sufficiently high so that at least all the nitrogen base sulfates other than isoquinoline sulfate formed remain in solution in the mixture; thereafter cooling said solution to a temperature sufficiently low to precipitate selectively a preponderant proportion of the isoquinoline sulfate in the mixture and to leave a preponderant proportion of the sulfates of nitrogen bases other than isoquinoline in solution.

9. In a process for preparing an enriched isoquinoline material from mixed nitrogen base products of lesser purity containing substantial quantities of isoquinoline along with other nitrogen bases having close boiling points, the steps which comprise cooling a substantially anhydrous mixture of acetic acid and mixed sulfates of said nitrogen bases from a temperature at which at least all the nitrogen base sulfates other than isoquinoline are in solution in the acetic acid to a temperature at which a preponderant proportion of the isoquinoline sulfate precipitates and a preponderant proportion of the sulfate of the nitrogen bases other than isoquinoline remains in solution, and recovering the isoquinoline sulfate material thus precipitated.

10. In a process for preparing an enriched isoquinoline material from mixed nitrogen base products of lesser purity containing substantial quantities of isoquinoline along with other nitrogen bases having close boiling points, the steps which comprise cooling a substantially anhydrous mixture of acetic acid and mixed sulfates of said nitrogen bases from a temperature at which at least all the nitrogen base sulfates other than isoquinoline sulfate are in solution to a temperature at which a preponderant proportion of the isoquinoline sulfate is in the solid state and a preponderant proportion of the sulfates of the nitrogen bases other than isoquinoline remains in solution, recovering the solid isoquinoline sulfate material, and thereafter effecting at least one recrystallization of the isoquinoline sulfate material from glacial acetic acid.

11. In a process for preparing an enriched isoquinoline material from mixed nitrogen base products of lesser purity containing substantial quantities of isoquinoline along with other nitrogen bases having close boiling points, the steps which comprise cooling a substantially anhydrous solution of the mixed sulfates of said nitrogen bases in acetic from a temperature at which all the nitrogen base sulfates are in solution to a temperature at which a preponderant proportion of the isoquinoline sulfate precipitates and a preponderant proportion of the sulfate of the nitrogen bases other than isoquinoline remains in solution and recovering the isoquinoline sulfate material thus precipitated.

12. In a process for preparing an enriched isoquinoline material from mixed nitrogen base products of lesser purity containing substantial quantities of isoquinoline along with other nitrogen bases having close boiling points, the steps which comprise cooling a substantially anhydrous solution of the mixed sulfates of said nitrogen bases in acetic acid from a temperature at which all the nitrogen base sulfates are in solution to a temperature at which a preponderant proportion of the isoquinoline sulfate precipitates and a preponderant proportion of the sulfates of the nitrogen bases other than isoquinoline remains in solution, recovering the isoquinoline sulfate material thus precipitated, and thereafter effecting at least one recrystallization of the isoquinoline sulfate material from glacial acetic acid.

HENRY L. STASSE.

No references cited.